United States Patent [19]

Tsurushima

[11] Patent Number: 5,148,418
[45] Date of Patent: Sep. 15, 1992

[54] DISC RECORDING APPARATUS

[75] Inventor: Katsuaki Tsurushima, Kanagawa, Japan

[73] Assignee: Sony Corporation, Tokyo, Japan

[21] Appl. No.: 827,891

[22] Filed: Jan. 30, 1992

Related U.S. Application Data

[63] Continuation of Ser. No. 422,062, Oct. 16, 1989, abandoned.

[30] Foreign Application Priority Data

Oct. 20, 1988 [JP] Japan ................. 63-265182

[51] Int. Cl.⁵ ........................................... G11B 27/22
[52] U.S. Cl. ....................... 369/32; 369/33; 369/50; 369/44.27; 369/44.29; 360/69; 360/73.03
[58] Field of Search ............... 369/32, 33, 43, 47, 369/48, 50, 44.11, 44.26, 44.27, 124, 127, 30, 44.28, 54, 64, 57, 58, 44.29; 358/342, 341, 355; 360/69, 73.03

[56] References Cited

U.S. PATENT DOCUMENTS 4,882,719 11/1989 Kimura et al. ............. 369/32 X
4,893,193 1/1990 Nakamura et al. ............ 358/341

FOREIGN PATENT DOCUMENTS

0164061A1 12/1985 European Pat. Off. .
0259666A1 3/1988 European Pat. Off. .
0273421A2 7/1988 European Pat. Off. .

Primary Examiner—Roy N. Envall, Jr.
Assistant Examiner—Hung Dang
Attorney, Agent, or Firm—Philip M. Shaw, Jr.

[57] ABSTRACT

The present invention relates to a recording method and a recording apparatus for use with a disc having a data area in which data has been recorded and an area for recording control information (i.e., Table of Contents information) for accessing a head to the data area. The recording apparatus comprises means for inhibiting the fetching of a disc if the control information has not been recorded in a predetermined area of the disc. Further, by providing a memory for storing the control information, the invention permits the accessing of a head to the data area in accordance with the content of the memory. Thus, information recorded on the disc before the control information is recorded onto a predetermined area on the disc can be reproduced.

11 Claims, 2 Drawing Sheets

DISC RECORDING APPARATUS

This is a continuation of co-pending application Ser. No. 07/422,062 filed on Oct. 16, 1989, now abandoned.

FIELD OF THE INVENTION

The present invention relates to a disc recording apparatus and method, for recording data on a disc in a compact disc format, or a format similar thereto.

DESCRIPTION OF THE PRIOR ART

In a conventional WORM (Write Once, Read Many) type optical disc, its reflectance is 40% or less. On the other hand, according to the prevailing standard, a read only compact disc has a reflectance of 70% or more. Therefore, even if the mechanical parameters (size of outer diameter, diameter of center hole, thickness, and the like) of a conventional WORM type optical disc are made coincident with those of a compact disc, the optical parameters (reflectance, refractive index, and the like) cannot satisfy the standard of the compact disc and it is impossible to reproduce the conventional WORM type optical disc by an existing compact disc player.

However, a WORM type optical disc whose reflectance exceeds 70% has been developed by using organic dye material. In such a WORM type optical disc, a disc whose optical parameters as well as the mechanical parameters can satisfy the standard of the compact disc can be realized. Therefore, if such a WORM type optical disc is used, a WORM type compact disc which can be reproduced by an existing compact disc player can be realized.

However, with WORM type compact discs which can be reproduced by existing compact disc players, there is a possibility such that a disc in which TOC (Table of Contents) data is not written may be loaded to a compact disc player. Such loading of a disc in which TOC data is not recorded is very dangerous, because in this case the optical pickup cannot be set to the initial position at the start of reproduction.

That is, in the compact disc format, the TOC data is provided in the lead-in portion of the innermost rim, and the time code at the start of each music program recorded on the disc, the number of the first music program, the number of the last music program, the final recording time, and the like are recorded as TOC data.

In the case of the WORM type compact disc, since data cannot be rewritten, after the TOC data has been written once, even if there is an allowance of the recording capacity of the disc, no additional data can be recorded.

Therefore, it is conventional when using WORM type compact discs which can be reproduced by existing compact disc players, that no information is recorded in the TOC area until the data recording area is filled with data. If such a disc is used as mentioned above, there is a possibility such a disc in which TOC information is not recorded may be loaded to a compact disc player.

As is well-known, in a compact disc player, when a disc is loaded, control is executed in a manner such that the pickup is first moved to the lead-in portion of the innermost rim and the TOC data is read. At this time, when a disc having no TOC data is loaded, the pickup cannot be moved to the initial position but continuously moves on the disc, so that there is a danger such that the moving mechanism of the pickup will break.

OBJECTS AND SUMMARY OF THE INVENTION

It is, therefore, an object of the invention to provide a disc recording apparatus which can prevent the loading (or "fetching") of a disc in which no TOC is written to a reproduction apparatus.

In order to accomplish the above mentioned object, according to one aspect of the present invention, there is provided a disc recording apparatus for use with a disc having a data area in which information may be recorded in a predetermined position, and a control information area in which control information may be recorded for use in accessing a head to the predetermined position, comprising:

state conversion means for converting the disc recording apparatus from a first state in which recording is executed, into a second state in which loading of the disc is executed; and control means connected to the state conversion means for inhibiting the state conversion means from converting the disc recording apparatus into the second state if the control information is not recorded in the control information area during the first state.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

An embodiment of the present invention will be described hereinbelow with reference to the drawings.

Figure 1:
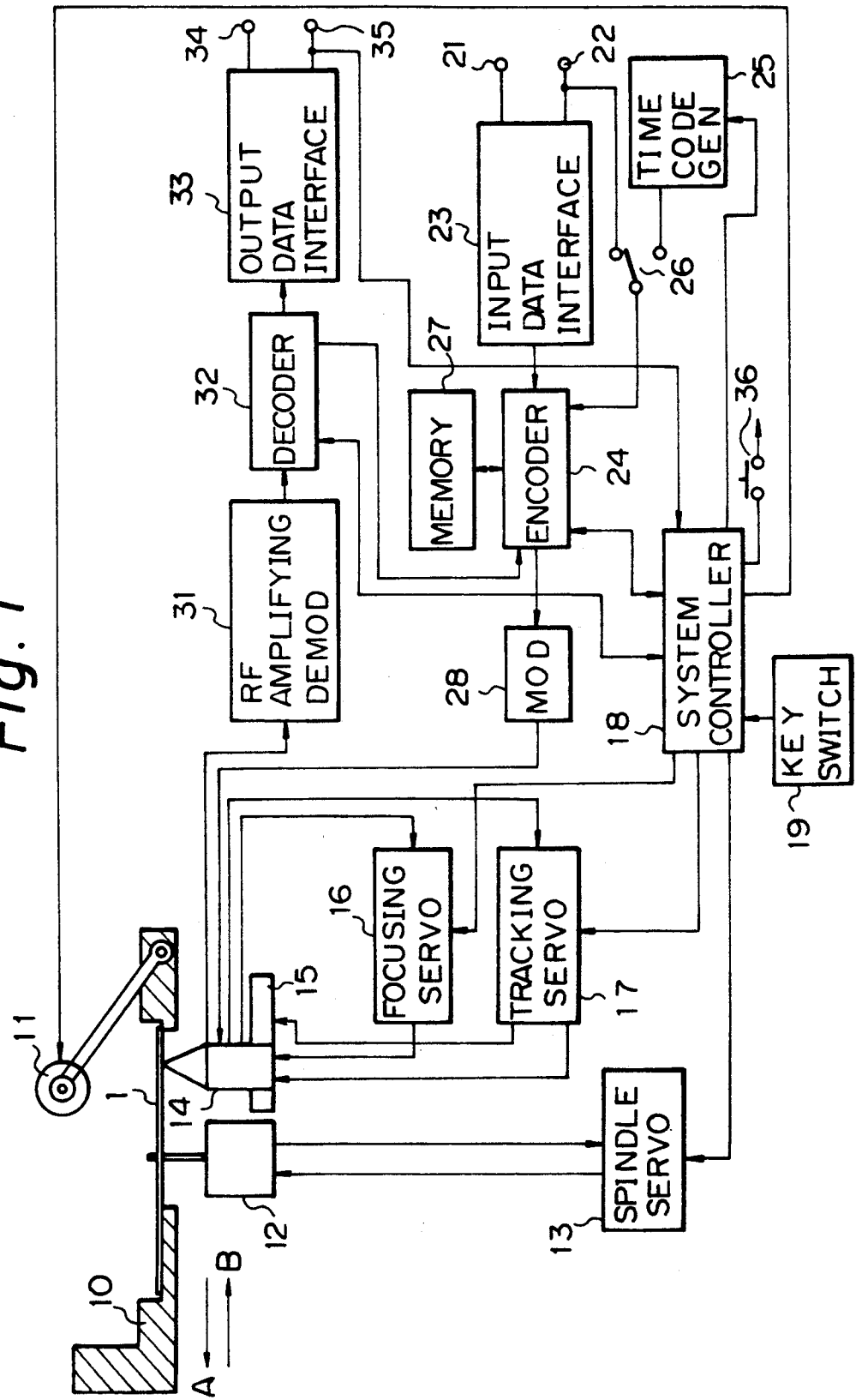
FIG. 1 is a block diagram of an embodiment of the present invention.
Figure 2:
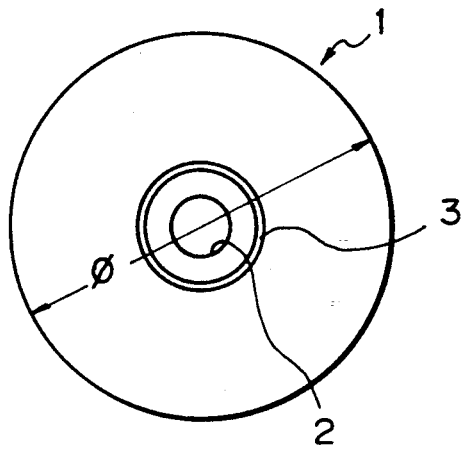
FIG. 2 is a plan view of a disc employed in an embodiment of the invention.

FIG. 1 shows an embodiment of the invention. In FIG. 1, reference numeral 1 denotes a WORM type compact disc. The WORM type compact disc 1 is an optical disc in which data can be written only once. The WORM type compact disc 1 satisfies the standard of the compact disc with respect to both of the mechanical and optical parameters. That is, as shown in FIG. 2, a diameter $\phi$ of the WORM type compact disc 1 is set to, for instance, 12 cm and a center hole 2 of, for instance, 15 mm is formed at the center of the disc. On the other hand, the reflectance of WORM type compact disc 1 is set to 70% or more.

Guide grooves are formed along tracks on WORM type compact disc 1. The tracking control is executed along the guide grooves. Concave and convex portions are formed in the width direction on the guide grooves and time code information can be also wobble recorded.

The WORM type compact disc 1 is set on a tray 10. The tray 10 is driven by a tray driving mechanism 11. When the WORM type compact disc 1 is loaded to the recording apparatus, the tray 10 is driven by the tray driving mechanism 11 (as shown by an arrow A) to expose disc 1 to the outside. When the WORM type compact disc 1 is put on the tray 10, the WORM type compact disc 1 is conveyed into the recording apparatus by the tray 10, in the direction shown by an arrow B, and is attached to a rotary shaft of a spindle motor 12.

The spindle motor 12 is controlled by a spindle servo circuit 13 and rotated. Thus, the WORM type compact disc 1 is rotated at the CLV (Constant Linear Velocity).

An optical pickup 14 can be moved in the radial direction of the WORM type compact disc 1 by a thread feeding mechanism 15. A focusing servo circuit 16 and a tracking servo circuit 17 are provided for the optical pickup 14. The focusing servo circuit 16, tracking servo circuit 17, and spindle servo circuit 13 are under the control of a system controller 18. Commands are given from a key switch 19 to the system controller 18.

In a recording operation, digital data is input from an input terminal 21. The digital data from the input terminal 21 is sent to an encoder 24 through an input data interface 23. On the other hand, in the case of using a time code from the outside, time code data is input from an input terminal 22. The time code data is sent to the encoder 24 through a switch 26. For instance, in the case where data of another compact disc is dubbed to the WORM type compact disc 1, the reproduction digital audio data of the other compact disc is input to the input terminal 21. The time code data which is obtained from a subcode of the other compact disc is input to the input terminal 22.

In the case of using the internal time code, the time code data from a time code generating circuit 25 is sent to the encoder 24 through the switch 26. The time code generating circuit 25 is controlled by the system controller 18.

In the case where time code has been wobble recorded on the guide grooves of the tracks of the WORM type compact disc 1, the time code is derived from a decoder 32. The time code is sent to the encoder 24 and to the system controller 18.

A reproduction sync signal is supplied from the decoder 32 to the encoder 24. The digital data from the input terminal 21 is encoded by the encoder 24 in accordance with the recording format of the compact disc. That is, the digital data from the input terminal 21 is developed into predetermined frames and is added with error correction code by the CIRC (Cross Interleave Reed Solomon Code) and up to 108 frames are interleaved. The subcode data is formed on the basis of the time code data from the input terminal 22 or time code generating circuit 25 and the subcode data is added.

The data encoded by the encoder 24 is sent to a modulator 28 and is EFM (Eight to Fourteen Modulation) modulated by the modulator 28. An output of the modulator 28 is supplied to the optical pickup 14. A laser beam modulated by an output of the modulator 28 is output from the optical pickup 14. The laser beam is irradiated onto the WORM type compact disc 1.

The TOC (Table of Contents) data is formed from the content of the data which is recorded on the WORM type compact disc 1 and its time code. The TOC data is stored into a memory 27 as the occasion arises.

After the recording of data to the area of WORM type compact disc 1 outside of the lead-in portion 3 (FIG. 2), when a tray opening button 36 is depressed, the optical pickup 14 is moved to lead-in portion 3 of the innermost rim of the WORM type compact disc 1 in accordance with a command from the system controller 18. The TOC data stored in the memory 27 is then recorded into the lead-in portion 3.

Figure 3:
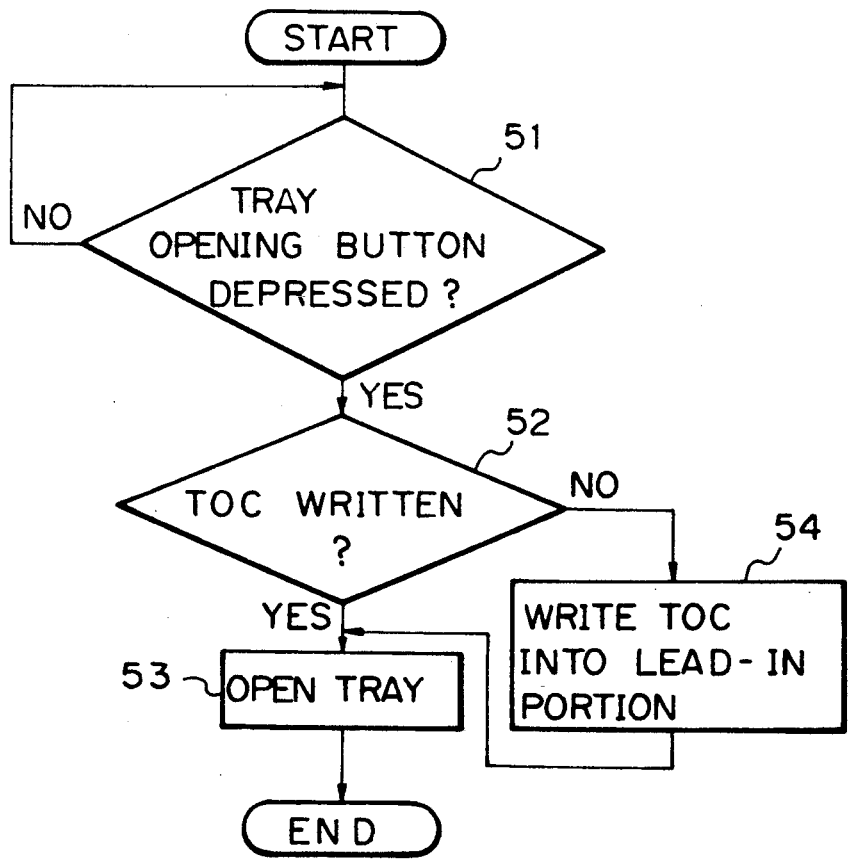
FIG. 3 is a flowchart which is used to explain the embodiment of the invention.

That is, as shown in FIG. 3, when the WORM type compact disc 1 is to be translated out of the recording apparatus, a check is first made to see if the tray opening button 36 has been depressed or not (step 51). If it is determined that the tray opening button 36 has been depressed, a check is made to see if the TOC data has been recorded in the lead-in portion 3 of the innermost rim of the disc or not (step 52).

If the TOC data has been recorded in the lead-in portion 3 of the innermost rim of the disc, a drive signal is given to the tray driving mechanism 11 and the tray 10 is opened (step 53). If the TOC data is not recorded in the lead-in portion 3 of the innermost rim of the disc, the optical pickup 14 is moved to the lead-in portion 3 of the innermost rim of the disc and the TOC data is written into the lead-in portion 3 (step 54). After the TOC data has been recorded to the innermost rim of the disc as mentioned above, the tray 10 is opened.

In an embodiment of the invention, the TOC data is written into the lead-in portion 3 of the innermost rim of the disc in association with the depression of the tray opening button 36. Therefore, when the WORM type compact disc 1 is taken out of the recording apparatus, the TOC data has certainly been recorded into the lead-in portion 3 of the innermost rim of the disc.

Upon reproduction, the recording signal of the WORM type compact disc 1 is reproduced by the optical pickup 14, the reproduction RF signal is supplied to an RF amplifying demodulator 31. The recording signal of the WORM type compact disc 1 is demodulated by the RF amplifying demodulator 31. The demodulated data is sent to the decoder 32. In the decoder 32, a deinterleaving process, an error correcting process of the CIRC, and the like are executed and the reproduction data from the WORM type compact disc 1 is decoded. The time code data is reproduced from the subcode which is derived from the reproduction data of the WORM type compact disc 1.

The reproduction data decoded by the decoder 32 is output from an output terminal 34 through an output data interface 33. On the other hand, the time code data reproduced by the decoder 32 is output from an output terminal 35 through the output data interface 33 and is sent to the system controller 18.

Upon reproduction, the optical pickup 14 is first moved to the lead-in portion 3 of the innermost rim of the disc. The TOC data recorded in the lead-in portion 3 is read. The recording position information of the data recorded on the WORM type compact disc 1 to be reproduced is obtained from the TOC data.

Therefore, if the TOC data is not recorded in the lead-in portion 3 of the innermost rim of the WORM type compact disc 1, the initial position of the optical pickup 14 is not determined at the start of the reproduction. Therefore, there is a risk that the moving mechanism of the optical pickup 14 will oscillate and the moving mechanism of the optical pickup 14 will be damaged.

In an embodiment of the invention, as mentioned above, the TOC data is written into the lead-in portion 3 of the innermost rim of the disc in association with the depression of the tray opening button 36. Therefore, when the WORM type compact disc 1 has been taken out of the recording apparatus, the TOC data has certainly been recorded in the lead-in portion 3 of the innermost rim of the disc. Thus, the invention avoids the possibility that the position of the optical pickup 14 is not determined at the start of the reproduction and the moving mechanism of the optical pickup 14 may be damaged.

After data has been recorded to the WORM type compact disc 1, in order to confirm the recorded data, the user may want to try to reproduce the data before the WORM type compact disc 1 is fetched from the recording apparatus. In this case, the TOC data stored in the memory 27 is referenced and the optical pickup 14 is moved to a desired position in response to the TOC data stored in the memory 27.

In the above embodiment, control is made in a manner such as to write the TOC data into the lead-in portion 3 of the innermost rim of the WORM type compact disc 1 in association with the depression of the tray opening button 36, thereby allowing the TOC data to be certainly recorded in the lead-in portion 3 of the innermost rim of each WORM type compact disc 1 taken out of the recording apparatus. However, the invention is not limited to such control. It is also possible to perform any control such that the TOC data is certainly recorded in the lead-in portion 3 of the innermost rim of the disc when the WORM type compact disc 1 (on which data has been recorded) is taken out of the recording apparatus. For instance, it is also possible to perform control in a manner such that when an end confirmation button is depressed, TOC data is recorded into the lead-in portion 3 of the innermost rim of the disc and if the end confirmation button is not depressed, the tray 10 is inhibited from being opened.

As mentioned above, according to the invention, control is made so as to write the TOC data into the lead-in portion 3 of the innermost rim of the disc in association with the depression of the tray opening button 36. Thus, when the WORM type compact disc 1 is taken out of the recording apparatus, the TOC data is certainly recorded in the lead-in portion 3 of the innermost rim of the disc. Therefore, in the case where information recorded in the data area of disc 1 (the area surrounding portion 3) is reproduced, at the start of the reproduction, the optical pickup 14 can be moved to the lead-in portion of the innermost rim of the disc to allow the TOC data to be certainly read and it is possible to eliminate the danger such that at the start of the reproduction, the initial position of the optical pickup 14 is not determined and the moving mechanism of the optical pickup 14 is damaged.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A disc recording apparatus for recording information onto a disc, wherein the disc has a data area for recording data in a predetermined position, and a control information area for recording control information for use in accessing a head to the predetermined position, comprising:

state conversion means for converting the disc recording apparatus from a first state in which recording is executed, into a second state in which loading of the disc from the disc recording apparatus is executed; and control means connected to the state conversion means for inhibiting the state conversion means from converting the disc recording apparatus into the second state if the control information is not recorded in the control information area during the first state.

2. A disc recording apparatus according to claim 1, wherein the control information is a table of contents.

3. A disc recording apparatus according to claim 1, wherein the state conversion means includes a disc loading and unloading tray mechanism, wherein the control means comprises a command means for commanding the tray mechanism to unload the disc, and wherein the control means executes recording of the control information in response to such an unload command from the command means.

4. A disc recording apparatus according to claim 1, wherein the control means comprises detecting means for detecting that no control information has been recorded in the control information area, and wherein the control means inhibits the state conversion means from converting the disc recording apparatus into the second state in response to an output of the detecting means.

5. A disc recording apparatus according to claim 1, wherein the disc recording apparatus comprises a command means for commanding the end of the recording of information into the data area.

6. A disc recording apparatus according to claim 1, also comprising a memory for storing the control information.

7. A disc recording apparatus according to claim 6, comprising information reproducing means for reproducing, prior to the recording of the control information in the control information area of the disc, information recorded in the data area by accessing a head to the data area in response to the control information stored in the memory.

8. A method for controlling loading of a disc on which information has been recorded in a predetermined position, wherein the disc has a control information area for recording control information for use in accessing a head to the predetermined position, including the step of:

blocking loading of the disc, after information has been recorded into the data area, if control information corresponding to the information is not first recorded into the control information area.

9. A method according to claim 8, wherein the control information is stored in a memory, and including the step of:

reproducing, prior to the recording of the control information into the control information area on the disc, the information recorded in the data area in response to the control information stored in the memory.

10. A method according to claim 8, wherein the disc is ejected in response to a tray opening command, and including the step of:

automatically recording the control information in the control information area in response to the tray opening command.

11. A method according to claim 8, including the step of:

automatically recording the control information in the control information area in response to an end confirmation command.

* * * * *